(12) United States Patent
Kinoshita et al.

(10) Patent No.: US 8,087,038 B2
(45) Date of Patent: Dec. 27, 2011

(54) OPTICAL PICKUP HAVING THERMAL EXPANSION COMPENSATION

(75) Inventors: Yasushi Kinoshita, Hitachinaka (JP); Seiichi Katou, Tsuchiura (JP); Katsuhiko Kimura, Kasumigaura (JP); Seiji Ono, Yokosuka (JP); Naomitsu Kuroda, Yokohama (JP); Hidenao Saito, Yokohama (JP)

(73) Assignee: Hitachi Media Electronics Co., Ltd., Iqwate-ken (JP)

( * ) Notice: Subject to any disclaimer, the term of this patent is extended or adjusted under 35 U.S.C. 154(b) by 1367 days.

(21) Appl. No.: 11/668,034

(22) Filed: Jan. 29, 2007

(65) Prior Publication Data
US 2008/0189726 A1 Aug. 7, 2008

(30) Foreign Application Priority Data
Aug. 3, 2006 (JP) .................................. 2006-212356

(51) Int. Cl.
*G11B 7/135* (2006.01)
(52) U.S. Cl. ........................................ 720/681; 720/688
(58) Field of Classification Search ........... 720/681–688
See application file for complete search history.

(56) References Cited

U.S. PATENT DOCUMENTS

| | | | | |
|---|---|---|---|---|
| 5,323,378 A * | 6/1994 | Kim et al. | ...................... | 720/684 |
| 5,526,193 A * | 6/1996 | Anzai | ........................... | 359/819 |
| 6,115,347 A * | 9/2000 | Ichimura et al. | .......... | 369/112.24 |
| 6,327,241 B1 * | 12/2001 | Boutaghou et al. | ........... | 369/300 |
| 6,549,346 B2 * | 4/2003 | Wada et al. | .................... | 359/814 |
| 6,701,041 B2 * | 3/2004 | Kagami et al. | ................... | 385/34 |
| 6,826,769 B2 * | 11/2004 | Hirokane et al. | ............. | 720/688 |
| 6,865,743 B2 * | 3/2005 | Nakata et al. | ................. | 720/689 |
| 7,738,196 B2 * | 6/2010 | Seki | ............................. | 359/820 |
| 2007/0109923 A1 | 5/2007 | Mizuno et al. | | |

FOREIGN PATENT DOCUMENTS

| | | |
|---|---|---|
| JP | 2001-143294 | 5/2001 |
| JP | 2002-197718 | 7/2002 |
| JP | 2003-091847 | 3/2003 |
| JP | 2003-141752 | 5/2003 |
| JP | 2005-108336 | 4/2005 |
| WO | WO 2006/003997 | 1/2006 |

OTHER PUBLICATIONS

Machine English translation of JP2005-108336; Furuichi et al. pp. 1-18.*

* cited by examiner

*Primary Examiner* — Brian Miller
(74) *Attorney, Agent, or Firm* — Antonelli, Terry, Stout & Kraus, LLP.

(57) ABSTRACT

An aspect of the invention provides an optical pickup in which an optical axis is not displaced even if ambient temperature is changed. The optical pickup of the invention has an optical unit and an optical pickup case. The optical unit has a lens member having an optical axis, and the optical axis of the lens member is offset to one side from the center of the optical unit. The optical pickup case holds the optical unit from both sides. A thermal expansion amount of the optical unit is absorbed by compression amounts of a first adhesive and a second adhesive such that the optical axis of the lens member is not displaced when the optical unit is thermal expanded.

2 Claims, 5 Drawing Sheets

Sa>Sb ta>tb

Ea>Eb

Fig. 8  Conventional
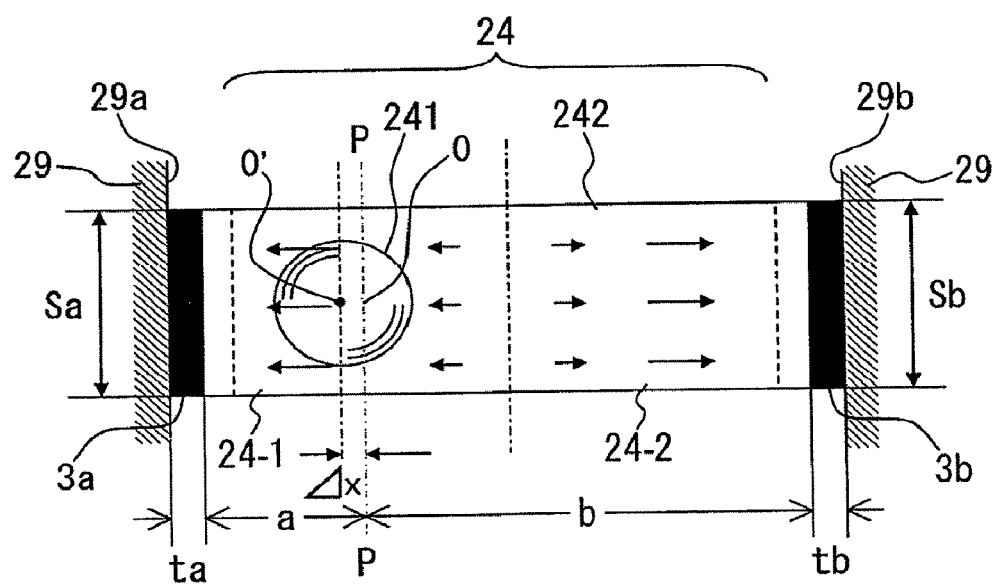

OPTICAL PICKUP HAVING THERMAL EXPANSION COMPENSATION

FIELD OF THE INVENTION

The present invention relates to an optical pickup used in an optical disk drive in which information is written in and read from a recording surface of an optical disk.

BACKGROUND OF THE INVENTION

In the optical pickup, a laser beam is focused on a recording surface of the optical disk, and the laser beam is detected from the recording surface of the optical disk. The optical pickup is formed by a combination of optical elements such as a laser, a mirror, a lens and a photodetector. For an optical axis of the optical element, position accuracy and inclination accuracy which affect aberration of the laser beam are important in the reading and writing operations.

In the optical pickup, an optical pickup case having high stiffness is used to maintain the position accuracy and inclination accuracy of the optical element. The optical element is directly fixed to the optical pickup case with an adhesive, or the optical element is fixed to the optical pickup case with the adhesive while held by a holding member. In fixing the optical element with the adhesive, unlike the fixing with a screw, it is not necessary to provide a space for a screw threaded portion, so that the adhesive is suitable to the fixing of the small components such as the optical element.

However, curing, contraction, and swelling are generated in the adhesive as time advances or by a change in ambient temperature. Therefore, sometimes the position and inclination are displaced in the optical element.

Japanese Patent Application Laid-Open No. 2002-197718 discloses a method of bonding the optical element at horizontally symmetrical positions in order to avoid the problem caused by the adhesive. Therefore, the displacements of the position and inclination can be decreased in the optical element, even if the expansion or contraction is generated in the adhesive.

In the optical pickup, sometimes an aberration correction element is mounted to correct unevenness of a thickness of a protective layer and a large spherical aberration generated by a layer jump of a multi-layered recording disk.

Japanese Patent Application Laid-Open No. 2003-91847 discloses an aberration correction element including a lens moving mechanism which moves a lens. The lens moving mechanism includes a drive motor, a guide shaft, and a lens holding member for holding the lens. Therefore, the aberration correction element is much larger than other optical elements in weight and size. As with other optical elements, it is also necessary that the aberration correction element be mounted in the optical pickup case with high accuracy.

In the optical element in which the drive motor, the guide shaft, the holding member for holding the lens are provided around the lens, like the aberration correction element, it is difficult that the lens is arranged in the center position of the optical component. Therefore, usually the lens is attached while offset from the center position of the optical component.

In such structures, the change in ambient temperature easily causes the displacements of the position and inclination of the lens. When the optical axis is displaced by the displacements of the position or inclination of the lens, the aberration is generated in a spot of the laser beam focused on the recording layer of the optical disk, which results in the problem that high-density recording is hardly performed.

SUMMARY OF THE INVENTION

In view of the foregoing, an object of the invention is to provide an optical pickup in which the optical axis of the optical element is not displaced even if the ambient temperature is changed.

An optical pickup according to an aspect of the invention has an optical unit which has a lens member having an optical axis, the optical axis of the lens member being offset to one side from a center of the optical unit; and an optical pickup case which holds the optical unit from both sides.

A thermal expansion amount of the optical unit is absorbed by a compression amount of the first adhesive and a compression amount of the second adhesive such that the optical axis of the lens member is not displaced when the optical unit is thermal expanded.

According to the optical pickup of the aspect of the invention, even if the ambient temperature is changed, the optical axis is not displaced in the lens of the optical element.

BRIEF DESCRIPTION OF THE DRAWINGS

FIG. 8 shows a configuration of a main part of a conventional optical pickup.

DESCRIPTION OF THE PREFERRED EMBODIMENTS

Figure 1:
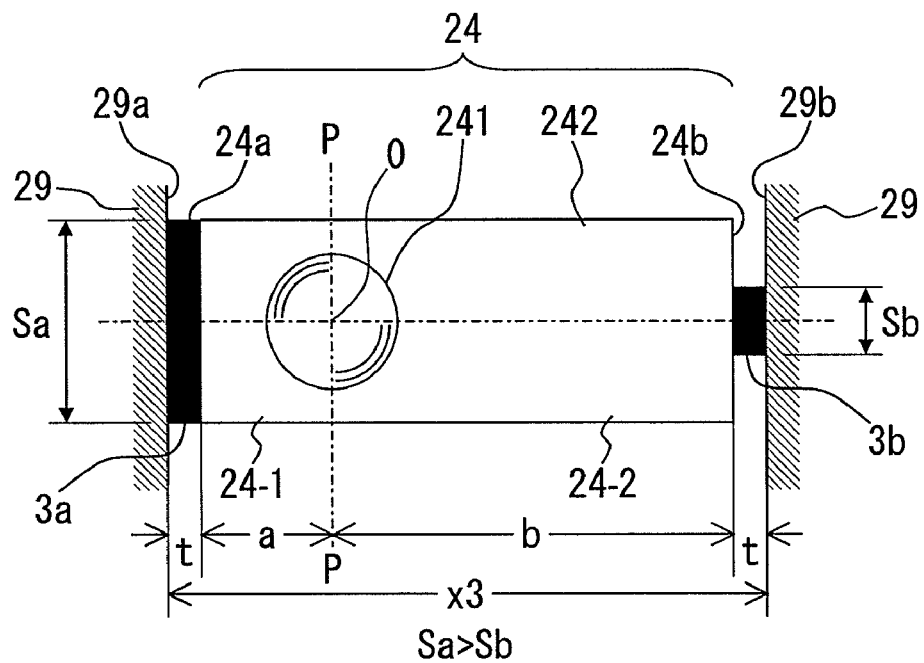
FIG. 1 shows a configuration of a main part of an optical pickup according to a first embodiment of the invention.

An optical pickup according to a first embodiment of the invention will be described with reference to FIG. 1. An optical unit 24 and an optical pickup case 29 will be described below. The optical unit 24 is a main part of the optical pickup, and the optical pickup case 29 holds the optical unit 24. The optical unit 24 has a lens member 241 and a holding member 242 which holds the lens member 241. The lens member 241 is an element, such as a lens, a mirror, and a liquid crystal device, which has an optical axis. The lens member 241 is made of glass or a transparent plastic material. The holding member 242 is integrally formed with the same material as the lens member 241, or the holding member 242 is formed independently of the lens member 241. The optical pickup case 29 is made of a metal material such as Al (aluminum) and Zn (zinc).

A recess is formed in the optical pickup case 29 to mount the optical unit 24, and the optical unit 24 is bonded to the recess provided in the optical pickup case 29. Adhesives 3a and 3b are inserted between inner surfaces 29a and 29b of the optical pickup case 29 and end faces 24a and 24b of the optical unit 24 respectively. Thus, the optical unit 24 is fixed to the recess of the optical pickup case 29 with the adhesives 3a and 3b. Hereinafter, the adhesive 3a inserted between the inner surface 29a of the recess of the optical pickup case 29 and the end face 24a of the optical unit 24 is referred to as first adhesive, and the adhesive 3b inserted between the inner surface 29b of the recess of the optical pickup case 29 and the end face 24b of the optical unit 24 is referred to as second adhesive.

In the first embodiment, an optical axis O of the lens member 241 is offset from the center of the optical unit 24. As shown in FIG. 1, the optical unit 24 is imaginarily divided into two portions by a plane p-p passing through the optical axis O of the lens member 241. It is assumed that a first portion 24-1 is the portion ranging from the plane p-p passing through the optical axis O of the lens member 241 to the end face 24a of the optical unit 24 while a second portion 24-2 is the portion ranging from the plane p-p passing through the optical axis O of the lens member 241 to the end face 24b of the optical unit 24. It is assumed that a is a dimension in an axis line direction of the first portion 24-1 and b is a dimension in the axis line direction of the second portion 24-2. The dimension a of the first portion 24-1 is smaller than the dimension b of the second portion 24-2, i.e., a<b.

In the first embodiment, a bonding area Sa of the first adhesive 3a is larger than a bonding area Sb of the second adhesive 3b, i.e., Sa>Sb. A thickness of the first adhesive 3a is equal to a thickness of the second adhesive 3b. A volume Va of the first adhesive 3a is larger than a volume Vb of the second adhesive 3b, i.e., Va>Vb. The first adhesive 3a is identical with the second adhesive 3b.

Then, the case in which ambient temperature of the optical pickup is changed will be described. When the ambient temperature rises, thermal expansion is generated in the optical unit 24. It is assumed that $\Delta x1$ is a thermal expansion amount of the first portion 24-1 of the optical unit 24 and $\Delta x2$ is a thermal expansion amount of the second portion 24-2. The total thermal expansion amount becomes $\Delta x1+\Delta x2$ as a whole of the optical unit 24.

The thermal expansion is also generated in the optical pickup case 29. A distance x3 between the inner surface 29a and 29b of the recess of the optical pickup case 29 is increased by thermal expansion. It is assumed that $\Delta x3$ is a thermal expansion amount of the distance x3. However, it is assumed that the thermal expansion amount $\Delta x3$ is sufficiently smaller than the thermal expansion amount of the optical unit 24.

The adhesives 3a and 3b are compressed when a dimension in a longitudinal direction of the optical unit 24 is increased by thermal expansion. It is assumed that $\Delta ta$ is a compression amount of the first adhesive 3a and $\Delta tb$ is a compression amount of the second adhesive 3b. The thermal expansion amount of the optical unit 24 is absorbed by the compression amounts of the adhesives 3a and 3b and the thermal expansion amount $\Delta x3$ of the distance x3 between the inner surfaces 29a and 29b of the recess of the optical pickup case 29. Accordingly, the following expression holds:

$$\Delta x1+\Delta x2=\Delta x3+\Delta ta+\Delta tb \quad \text{(Formula 1)}$$

The dimension a of the first portion 24-1 is smaller than the dimension b of the second portion 24-2. It is assumed that a thermal expansion coefficient of the first portion 24-1 is equal to a thermal expansion coefficient of the second portion 24-2. The thermal expansion amount $\Delta x1$ of the first portion 24-1 is smaller than the thermal expansion amount $\Delta x2$ of the second portion 24-2.

$$\Delta xa<\Delta xb \quad \text{(Formula 2)}$$

As shown in FIG. 8, conventionally, when the bonding area Sa and thickness ta of the first adhesive 3a are equal to the bonding area Sb and thickness tb of the second adhesive 3b and, at the same time, when the adhesive 3a is identical with the second adhesive 3b, the compression amount $\Delta ta$ of the first adhesive 3a becomes equal to the compression amount $\Delta tb$ of the second adhesive 3b. In this case, when the thermal expansion is generated in the optical unit 24, the optical axis O of the lens member 241 is moved in a direction in which the optical axis O is brought close to the inner surface 29a of the recess of the optical pickup case 29. In FIG. 8, it is assumed that $\Delta x$ is a displacement between the optical axis O before the thermal expansion and the optical axis O' after the thermal expansion. As the offset of the optical axis O of the lens member 241 from the center of the optical unit 24 is increased, the displacement $\Delta x$ of the optical axis of the lens member 241, caused by thermal expansion, is increased.

On the contrary, in the invention, even if the thermal expansion is generated in the optical unit 24, the optical axis O of the lens member 241 is not moved with respect to the optical pickup case 29. The reason will be described in detail below.

The condition that the optical axis O of the lens member 241 is not moved is considered. The thermal expansion of the optical pickup case 29 is neglected. The optical axis O of the lens member 241 is not moved, when the thermal expansion amount $\Delta x1$ of the first portion 24-1 is equal to the compression amount $\Delta ta$ of the first adhesive 3a and, at the same time, when the thermal expansion amount $\Delta x2$ of the second portion 24-2 is equal to the compression amount $\Delta tb$ of the second adhesive 3b.

$$\Delta x1=\Delta ta \quad \text{(Formula 3)}$$

$$\Delta x2=\Delta tb \quad \text{(Formula 4)}$$

At this point, the optical axis O of the lens member 241 is not moved with respect to the optical pickup case 29. Accordingly, a ratio of the thermal expansion amounts $\Delta x1$ and $\Delta x2$ is equal to a ratio of the compression amounts $\Delta ta$ and $\Delta tb$. Assuming that k is the ratio value, the following expression holds:

$$\Delta x1/\Delta x2=\Delta ta/\Delta tb=k \quad \text{(Formula 5)}$$

Assuming that P is a compressive force applied to the adhesives 3a and 3b, E is a Young's modulus of the adhesives 3a and 3b, and t is an original thickness of the adhesives 3a and 3b, the following expressions hold:

$$P/Sa=E \cdot \Delta ta/t \quad \text{(Formula 6)}$$

$$P/Sb=E \cdot \Delta tb/t \quad \text{(Formula 7)}$$

Because of Sa>Sb, the compression amount $\Delta ta$ of the first adhesive 3a is smaller than the compression amount $\Delta tb$ of the second adhesive 3b.

$$\Delta ta<\Delta tb \quad \text{(Formula 8)}$$

A relationship between the ratio of the compression amounts $\Delta ta$ and $\Delta tb$ and the ratio of the bonding areas Sa and Sb is obtained from Formulas 6 and 7. Accordingly, a relationship among the ratio of the thermal expansion amounts $\Delta x1$ and $\Delta x2$, the ratio of the compression amounts $\Delta ta$ and $\Delta tb$, and the ratio of the bonding areas Sa and Sb is expressed by the following expression.

$$\Delta x1/\Delta x2=\Delta ta/\Delta tb=Sb/Sa=k \quad \text{(Formula 9)}$$

As can be seen from Formula 9, the ratio of the bonding areas Sa and Sb is obtained when the ratio k of the thermal expansion amounts $\Delta x1$ and $\Delta x2$ of the two portions 24-1 and 24-2 is obtained.

An optical pickup according to a second embodiment of the invention will be described with reference to FIG. 2. In the optical pickup of the second embodiment, a thickness ta of the first adhesive 3a is smaller than a thickness tb of the second adhesive 3b, i.e., ta<tb. The bonding area of the first adhesive 3a is equal to the bonding area of the second adhesive 3b. The volume Va of the first adhesive 3a is smaller than the volume Vb of the second adhesive 3b, i.e., Va<Vb. The first adhesive 3a is identical with the second adhesive 3b.

In the second embodiment, because the thickness ta of the first adhesive 3a is smaller than the thickness tb of the second adhesive 3b, the compression amount Δta of the first adhesive 3a is smaller than the compression amount Δtb of the second adhesive 3b. Accordingly, even if the thermal expansion is generated in the optical unit 24, the optical axis O of the lens member 241 is not moved with respect to the optical pickup case 29.

The condition that the optical axis O of the lens member 241 is not moved is considered. The thermal expansion of the optical pickup case 29 is neglected. The optical axis O of the lens member 241 is not moved with respect to the optical pickup case 29, when the thermal expansion amount Δx1 of the first portion 24-1 is equal to the compression amount Δta of the first adhesive 3a and, at the same time, when the thermal expansion amount Δx2 of the second portion 24-2 is equal to the compression amount Δtb of the second adhesive 3b. Accordingly Formulas 1 to 5 hold.

Assuming that P is a compressive force applied to the adhesives 3a and 3b, S is a bonding area of the adhesives 3a and 3b, and E is a Young's modulus of the adhesives 3a and 3b, the following expressions hold:

$$P/S = E \cdot \Delta ta/ta \quad \text{(Formula 10)}$$

$$P/S = E \cdot \Delta tb/tb \quad \text{(Formula 11)}$$

Because of ta<tb, the compression amount Δta of the first adhesive 3a is smaller than the compression amount Δtb of the second adhesive 3b. Therefore, Formula 8 holds.

A relationship between the ratio of the compression amounts Δta and Δtb and the ratio of the thicknesses ta and tb is obtained from Formulas 10 and 11. Accordingly, a relationship among the ratio of the thermal expansion amounts Δx1 and Δx2, the ratio of the compression amounts Δta and Δtb, and the ratio of the thicknesses ta and tb is expressed by the following expression.

$$\Delta x1/\Delta x2 = \Delta ta/\Delta tb = ta/tb = k \quad \text{(Formula 12)}$$

As can be seen from Formula 12, the ratio of the thicknesses ta and tb of the adhesives is obtained when the ratio k of the thermal expansion amounts Δx1 and Δx2 of the two portions 24-1 and 24-2.

An optical pickup according to a third embodiment of the invention will be described with reference to FIG. 3. In the optical pickup of the third embodiment, the first adhesive 3a differs from the second adhesive 3b. A Young's modulus Ea of the first adhesive 3a is larger than a Young's modulus Eb of the second adhesive 3b, i.e., Ea>Eb. Because the bonding area and thickness of the first adhesive 3a are equal to the bonding area and thickness of the second adhesive 3b, the volume Va of the first adhesive 3a is equal to the volume Vb of the second adhesive 3b, i.e., Va=Vb.

In the optical pickup of the third embodiment, because the Young's modulus Ea of the first adhesive 3a is larger than the Young's modulus Eb of the second adhesive 3b, the compression amount Δta of the first adhesive 3a is smaller than the compression amount Δtb of the second adhesive 3b. Even if the thermal expansion is generated in the optical unit 24, the optical axis O of the lens member 241 is not moved with respect to the optical pickup case 29.

The condition that the optical axis O of the lens member 241 is not moved is considered. The thermal expansion of the optical pickup case 29 is neglected. The optical axis O of the lens member 241 is not moved with respect to the optical pickup case 29, when the thermal expansion amount Δx1 of the first portion 24-1 is equal to the compression amount Δta of the first adhesive 3a and, at the same time, when the thermal expansion amount Δx2 of the second portion 24-2 is equal to the compression amount Δtb of the second adhesive 3b. Accordingly Formulas 1 to 5 hold.

Assuming that P is a compressive force applied to the adhesives 3a and 3b, S is a bonding area of the adhesives 3a and 3b, and t is a thickness of the adhesives 3a and 3b, the following expressions hold:

$$P/S = Ea \cdot \Delta ta/t \quad \text{(Formula 13)}$$

$$P/S = Eb \cdot \Delta tb/t \quad \text{(Formula 14)}$$

Because of Ea>Eb, the compression amount Δta of the first adhesive 3a is smaller than the compression amount Δtb of the second adhesive 3b. Therefore, Formula 8 holds.

A relationship between the ratio of the Young's moduli Ea and Eb and the ratio of the compression amounts Δta and Δtb is obtained from Formulas 13 and 14. Accordingly, a relationship among the ratio of the thermal expansion amounts Δx1 and Δx2, the ratio of the compression amounts Δta and Δtb, and the ratio of the Young's moduli Ea and Eb is expressed by the following expression.

$$\Delta x1/\Delta x2 = \Delta ta/\Delta tb = Eb/Ea = k \quad \text{(Formula 15)}$$

As can be seen from Formula 15, the ratio of the Young's moduli Ea and Eb of the adhesives is obtained when the ratio k of the thermal expansion amounts Δx1 and Δx2 of the two portions 24-1 and 24-2 is obtained.

Figure 2:
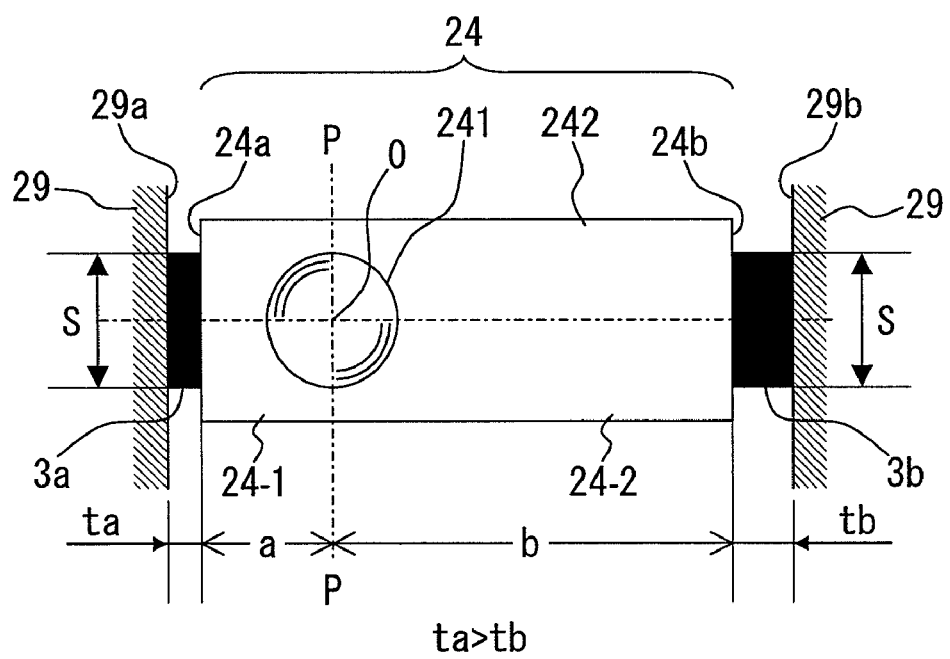
FIG. 2 shows a configuration of a main part of an optical pickup according to a second embodiment of the invention.
Figure 3:
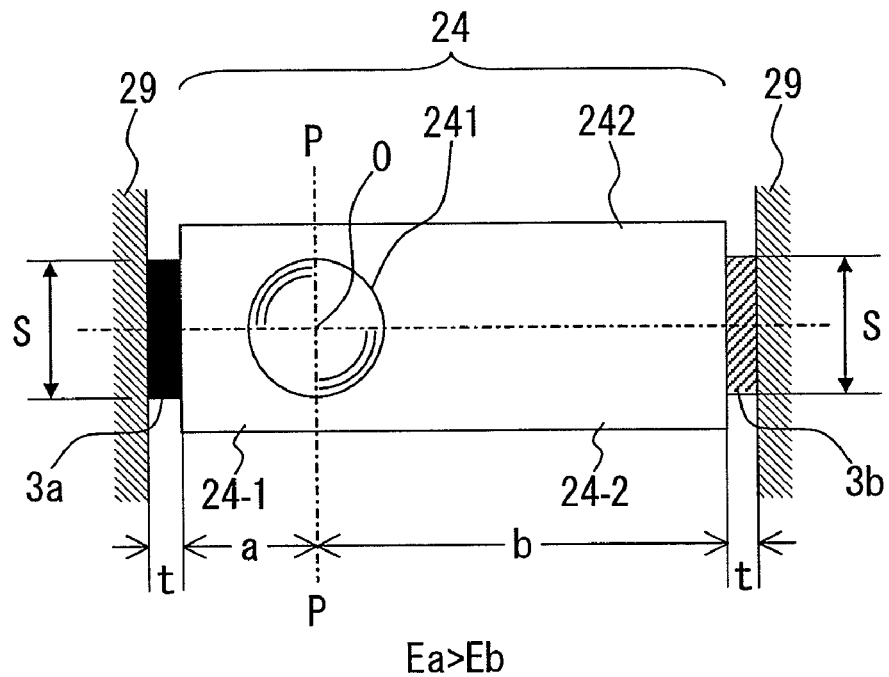
FIG. 3 shows a configuration of a main part of an optical pickup according to a third embodiment of the invention.

In the first to third embodiments shown in FIGS. 1 to 3, the dimension a of the first portion 24-1 is smaller than the dimension b of the second portion 24-2. However, the dimension a of the first portion 24-1 may be larger than the dimension b of the second portion 24-2. In this case, the same discussion holds, although the magnitude relations of the above description are reversed.

Figure 4:
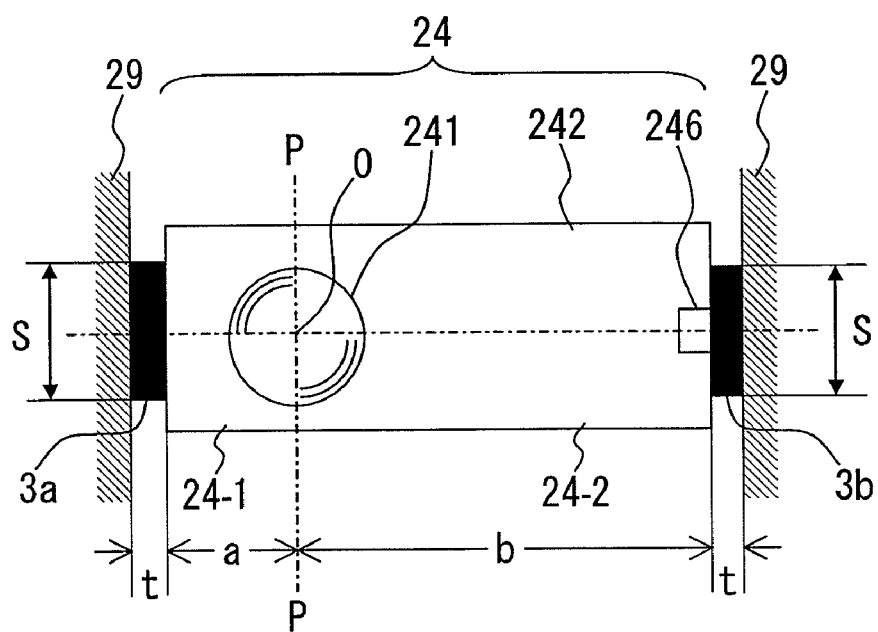
FIG. 4 shows a configuration of a main part of an optical pickup according to a fourth embodiment of the invention.

An optical pickup according to a fourth embodiment of the invention will be described with reference to FIG. 4. In the optical pickup of the fourth embodiment, a small recess 246 is provided in the end face 24b of the optical unit 24, and the recess 246 is covered with the adhesive 3b. Other configurations of the optical pickup of the fourth embodiment are similar to those of the optical pickup shown in FIG. 9. Accordingly, the bonding area and thickness of the first adhesive 3a are equal to the bonding area and thickness of the second adhesive 3b, and the adhesives 3a is identical with the adhesive 3b.

In the fourth embodiment, the actual bonding area between the end face 24b of the optical unit 24 and the second adhesive 3b is smaller than the bonding area between the end face 24a of the optical unit 24 and the first adhesive 3a by the area of the recess 246 of the end face 24b. Accordingly, the area in which the compressive force is applied to the second adhesive 3b is smaller than the area in which the compressive force is applied to the first adhesive 3a, and the compression amount Δta of the first adhesive 3a is smaller than the compression amount Δtb of the second adhesive 3b. Even if the thermal expansion is generated in the optical unit 24, the optical axis O of the lens member 241 is not moved with respect to the optical pickup case 29.

The condition that the optical axis O of the lens member 241 is not moved is considered. The thermal expansion of the optical pickup case 29 is neglected. The optical axis O of the lens member 241 is not moved with respect to the optical pickup case 29, when the thermal expansion amount Δx1 of the first portion 24-1 is equal to the compression amount Δta of the first adhesive 3a and, at the same time, when the thermal expansion amount Δx2 of the second portion 24-2 is equal to the compression amount Δtb of the second adhesive 3b. Accordingly Formulas 1 to 5 hold.

Formula 8 holds because the compression amount Δta of the first adhesive 3a is smaller than the compression amount Δtb of the second adhesive 3b. In the fourth embodiment, it is necessary that the amount of adhesive filled with into the recess 246 be adjusted such that Formula 5 holds.

In the fourth embodiment, the dimension a of the first portion 24-1 is smaller than the dimension b of the second portion 24-2. However, the dimension a of the first portion 24-1 may be larger than the dimension b of the second portion 24-2. In this case, the small recess is provided in the end face 24a on the opposite side of the optical unit 24.

An optical pickup according to a fifth embodiment of the invention will be described with reference to FIG. 5. In the optical pickup of the fifth embodiment, a small recess 291 is provided in the inner surface 29b of the recess of the optical pickup case 29, and the recess 291 is covered with the adhesive 3b. Other configurations of the optical pickup of the fifth embodiment are similar to those of the optical pickup shown in FIG. 4. Accordingly, the bonding area and thickness of the first adhesive 3a are equal to the bonding area and thickness of the second adhesive 3b, and the adhesives 3a is identical with the adhesive 3b.

In the fifth embodiment, the actual bonding area between the second adhesive 3b and the inner surface 29b of the recess of the optical pickup case 29 is smaller than the bonding area between the first adhesive 3a and the inner surface 29a of the recess of the optical pickup case 29 by the area of the recess 291 in the inner surface 29b of the optical pickup case 29. Accordingly, the area in which the compressive force is applied to the second adhesive 3b is smaller than the area in which the compressive force is applied to the first adhesive 3a, and the compression amount Δta of the first adhesive 3a is smaller than the compression amount Δtb of the second adhesive 3b. Even if the thermal expansion is generated in the optical unit 24, the optical axis O of the lens member 241 is not moved with respect to the optical pickup case 29.

The condition that the optical axis O of the lens member 241 is not moved is considered. The thermal expansion of the optical pickup case 29 is neglected. The optical axis O of the lens member 241 is not moved with respect to the optical pickup case 29, when the thermal expansion amount Δx1 of the first portion 24-1 is equal to the compression amount Δta of the first adhesive 3a and, at the same time, when the thermal expansion amount Δx2 of the second portion 24-2 is equal to the compression amount Δtb of the second adhesive 3b. Accordingly Formulas 1 to 5 hold.

Formula 8 holds because the compression amount Δta of the first adhesive 3a is smaller than the compression amount Δtb of the second adhesive 3b. In the fifth embodiment, it is necessary that the amount of adhesive filled with into the recess 291 be adjusted such that Formula 5 holds.

In the fifth embodiment, the dimension a of the first portion 24-1 is smaller than the dimension b of the second portion 24-2. However, the dimension a of the first portion 24-1 may be larger than the dimension b of the second portion 24-2. In this case, the small recess is provided in the inner surface 29a on the side opposite from the recess of the optical pickup case 29.

An optical pickup according to a sixth embodiment of the invention will be described with reference to FIGS. 6a and 6b. The optical unit 24 and the optical pickup case 29 will be described below. The optical unit 24 is a main part of the optical pickup, and the optical pickup case 29 holds the optical unit 24. FIG. 6a is a front view showing a configuration of the main part of the optical pickup according to the sixth embodiment, and FIG. 6b is a sectional plan view showing the main part of the optical pickup of the sixth embodiment. In the sixth embodiment, the optical unit 24 has first and second lens members 241a and 241b, a first holding member 242, a second holding member 243, a drive means 244, and guide shafts 245a and 245b. The first holding member 242 holds the first lens member, and the second holding member 243 holds the second lens member 241b. The drive means 244 moves the second holding member 243. The guide shafts 245a and 245b pierce through holes made in the second holding member 243. A transmission means such as a gear is provided between a shaft of the drive means 244 and the second holding member 243.

When the drive means 244 is driven, a driving force of the drive means 244 is transmitted to the second holding member 243 through the transmission means, which moves the second holding member 243 along the guide shafts 245a and 245b. When the second holding member 243 is moved, the distance between the first lens member 241a and the second lens member 241b is changed. Thus, a focal point is changed in an optical system comprising the two lens members 241a and 241b.

A recess is formed in the optical pickup case 29 to mount the optical unit 24, and the optical unit 24 is bonded to the recess provided in the optical pickup case 29. Adhesives 3a and 3b are inserted between the inner surfaces 29a and 29b of the optical pickup case 29 and the end faces 24a and 24b of the optical unit 24 respectively. Thus, the optical unit 24 is fixed to the recess of the optical pickup case 29 with the adhesives 3a and 3b.

It is assumed that the first portion 24-1 is the portion ranging from the plane p-p passing through the optical axis O of the lens member 241 to the end face 24a of the optical unit 24 while the second portion 24-2 is the portion ranging from the plane p-p passing through the optical axis O of the lens member 241 to the end face 24b of the optical unit 24. It is assumed that a is the dimension in the axis line direction of the first portion 24-1 and b is the dimension in the axis line direction of the second portion 24-2. The dimension a of the first portion 24-1 is smaller than the dimension b of the second portion 24-2, i.e., a<b.

As shown in FIGS. 6a and 6b, in the space occupied by the optical unit 24, a moving mechanism for moving the holding members 242 and 243 occupies a relatively large space. For example, the holding members 242 and 243 are the large components having a length equal to or more than ten times other optical elements mounted on the optical pickup 2. Accordingly, the optical axes of the lens members 241a and 241b are offset from the center of the optical unit 24. Therefore, in the conventional optical pickup, the positions of the optical axes of the lens members 241a and 241b are changed when the holding members 242 and 243 are thermally deformed by the change in ambient temperature.

However, in the sixth embodiment, when the thermal expansion of the optical pickup case 29 is neglected, the thermal expansion amount Δx1 of the first portion 24-1 is equal to the compression amount Δta of the first adhesive 3a and, the thermal expansion amount $\Delta x2$ of the second portion 24-2 is equal to the compression amount $\Delta tb$ of the second adhesive 3b. Accordingly, the optical axis O of the lens member 241 is not moved with respect to the optical pickup case 29.

Figure 5:
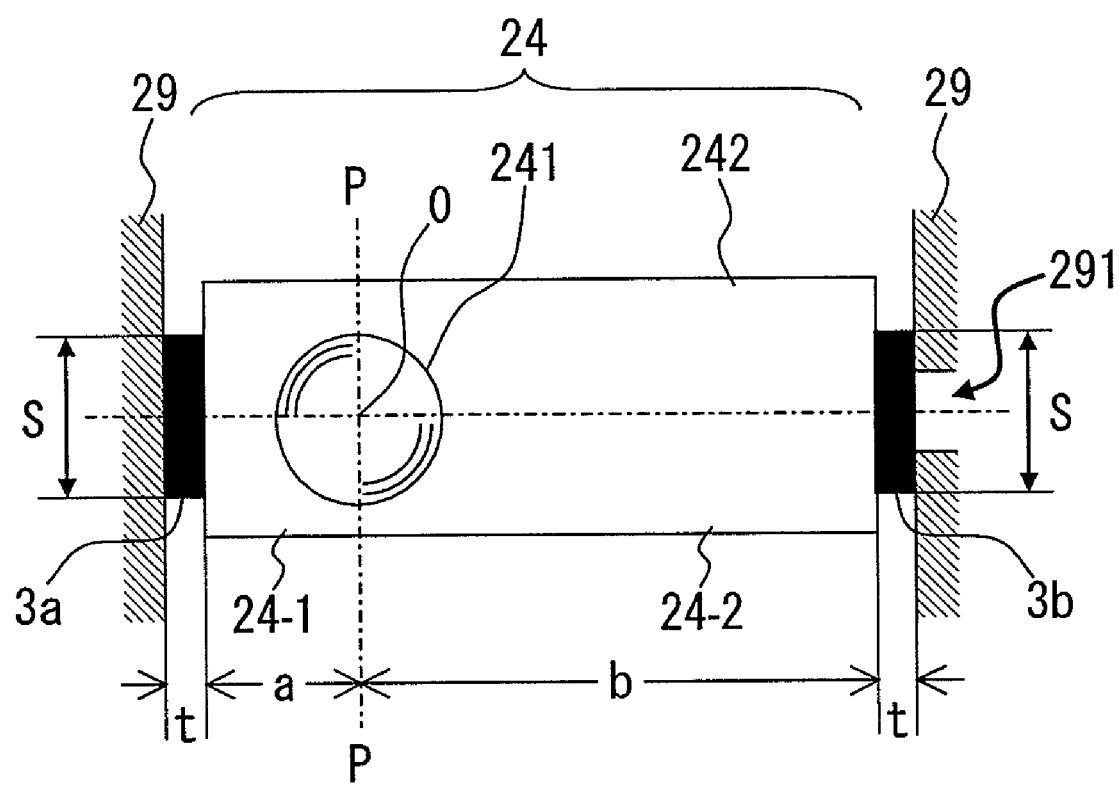
FIG. 5 shows a configuration of a main part of an optical pickup according to a fifth embodiment of the invention.
Figure 6:
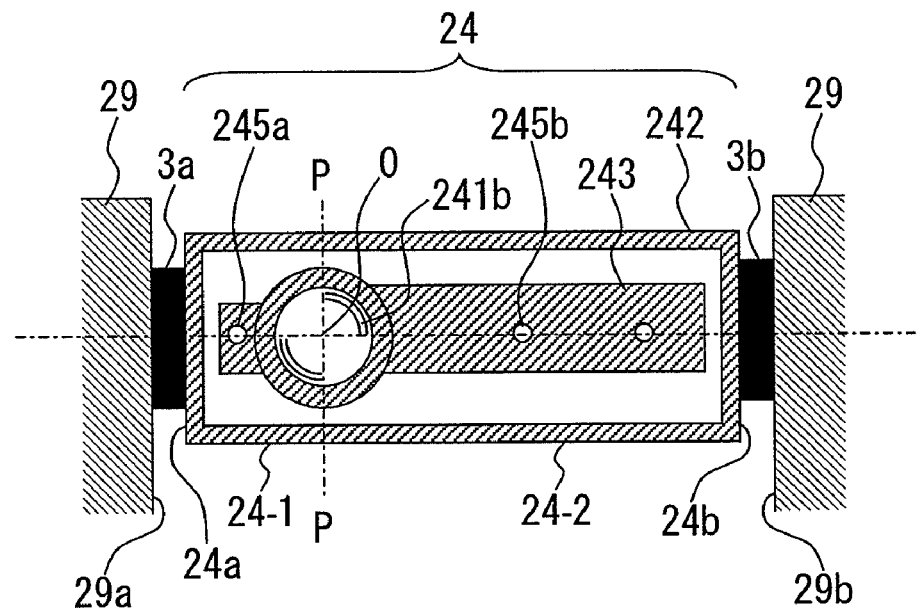
FIGS. 6a and 6b shows a configuration of a main part of an optical pickup according to a sixth embodiment of the invention.
Figure 6:
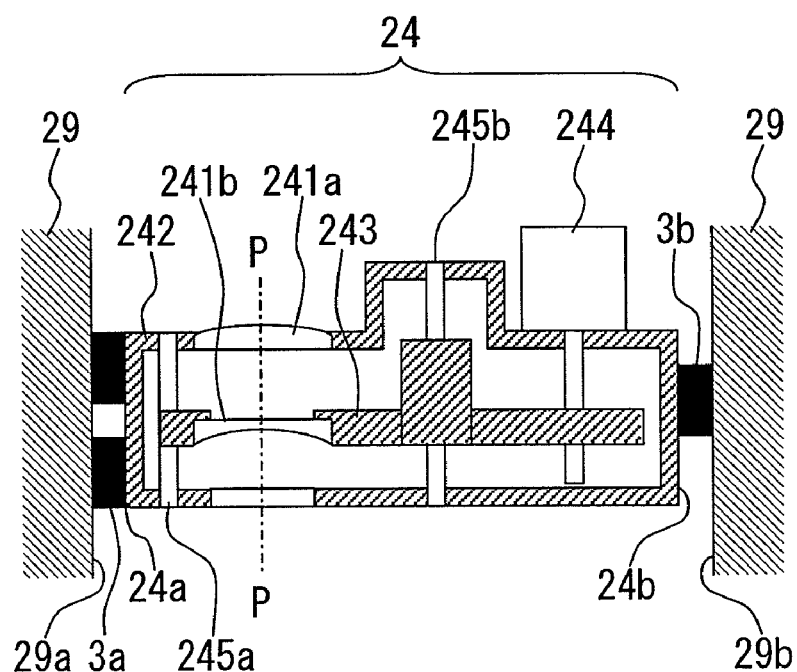

In the fifth and sixth embodiments shown in FIGS. 5 and 6, the dimension a of the first portion 24-1 is smaller than the dimension b of the second portion 24-2. However, the dimension a of the first portion 24-1 may be larger than the dimension b of the second portion 24-2. In this case, the same discussion holds, although the magnitude relations of the above description are reversed.

Figure 7:
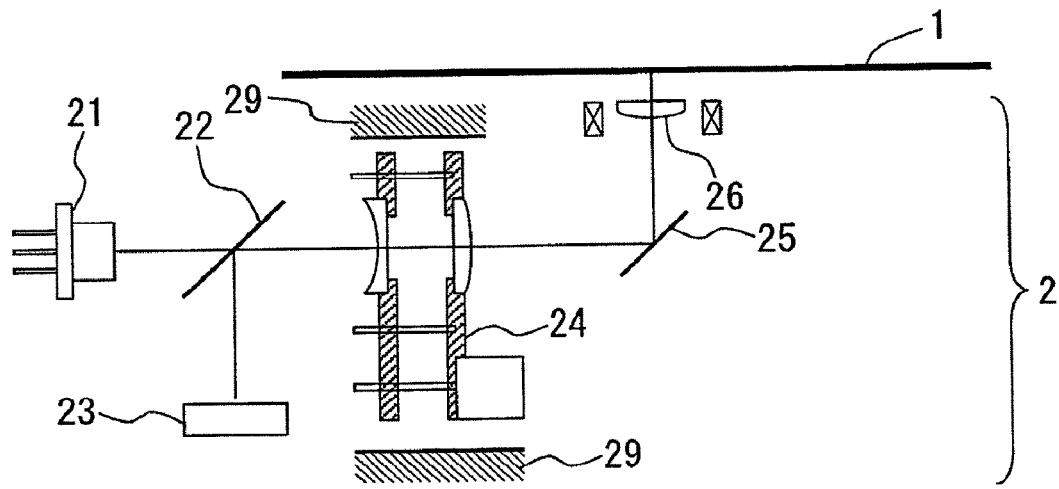
FIG. 7 shows a configuration of an optical pickup according to the invention.

FIG. 7 shows a configuration of an optical pickup according to the invention. An optical pickup 2 has a laser 21, a half mirror 22, a photodetector 23, an optical unit 24, a reflect mirror 25, and an objective lens 26. The optical unit 24 is bonded to the recess provided in the optical pickup case 29.

A recording surface of an optical disk 1 is irradiated with a laser beam emitted from the laser 21 through the half mirror 22, the optical unit 24, the reflect mirror 25, and the objective lens 26. The photodetector 23 detects the light from the recording surface of the optical disk 1 through the objective lens 26, the reflect mirror 25, the optical unit 24, and the half mirror 22.

The optical unit 24 is bonded to the recess provided in the optical pickup case 29 with the adhesive. The method of bonding the optical unit 24 and the optical pickup case 29 are shown in FIGS. 1 to 6. Accordingly, the position of the optical axis of the lens member included in the optical unit 24 is not changed even if the optical unit 24 is thermally deformed by the change in ambient temperature. Therefore, a good beam spot is formed on the recording surface of the optical disk, so that the optical pickup corresponding to the high-density recording can be provided. Additionally, the high-density optical disk drive in which the lens moving mechanism is required can be realized.

Thus, the embodiments of the invention are described. However, the invention is not limited to the above embodiments, but it will be obvious to those skilled in the art that various modifications could be made within the scope of the invention according to the claims.

What is claimed is:

1. An optical pickup comprising:
    an optical unit which has a lens member having an optical axis, the optical axis of the lens member being offset to one side from a center of the optical unit; and
    an optical pickup case which holds the optical unit from both sides,
    wherein a first end of the optical unit is bonded to the optical pickup case with a first adhesive,
    a second end of the optical unit is bonded to the optical pickup case with a second adhesive,
    the optical unit has a first portion ranging from the optical axis of the lens member to the first end of the optical unit and a second portion ranging from the optical axis of the lens member to the second end of the optical unit,
    a thermal expansion amount of the optical unit as caused by a change in ambient temperature, is absorbed by a compression amount of the first adhesive and a compression amount of the second adhesive such that the optical axis of the lens member is not displaced when the optical unit is thermally expanded,
    wherein the compression amount of the first adhesive is smaller than the compression amount of the second adhesive if the thermal expansion amount of the first portion is smaller than the thermal expansion amount of the second portion, and
    wherein a recess is provided in an attaching surface of the optical pickup case corresponding to the second end of the optical unit if the thermal expansion amount of the first portion is smaller than the thermal expansion amount of the second portion.

2. An optical pickup comprising:
    an optical unit which has a lens member having an optical axis, the optical axis of the lens member being offset to one side from a center of the optical unit; and
    an optical pickup case which holds the optical unit from both sides,
    wherein a first end of the optical unit is bonded to the optical pickup case with a first adhesive,
    a second end of the optical unit is bonded to the optical pickup case with a second adhesive,
    the optical unit has a first portion ranging from the optical axis of the lens member to the first end of the optical unit and a second portion ranging from the optical axis of the lens member to the second end of the optical unit,
    a thermal expansion amount of the optical unit as caused by a change in ambient temperature, is absorbed by a compression amount of the first adhesive and a compression amount of the second adhesive such that the optical axis of the lens member is not displaced when the optical unit is thermally expanded,
    wherein the compression amount of the first adhesive is larger than the compression amount of the second adhesive if the thermal expansion amount of the first portion is larger than the thermal expansion amount of the second portion, and
    wherein a recess is provided in an attaching surface of the optical pickup case corresponding to the first end of the optical unit if the thermal expansion amount of the first portion is larger than the thermal expansion amount of the second portion.

* * * * *